United States Patent
Kaneko et al.

(10) Patent No.: US 7,603,269 B2
(45) Date of Patent: Oct. 13, 2009

(54) SPEECH RECOGNITION GRAMMAR CREATING APPARATUS, CONTROL METHOD THEREFOR, PROGRAM FOR IMPLEMENTING THE METHOD, AND STORAGE MEDIUM STORING THE PROGRAM

(75) Inventors: Kazue Kaneko, Kawasaki (JP); Michio Aizawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 682 days.

(21) Appl. No.: 11/169,550

(22) Filed: Jun. 29, 2005

(65) Prior Publication Data

US 2005/0288931 A1     Dec. 29, 2005

(30) Foreign Application Priority Data

Jun. 29, 2004   (JP)   .............................. 2004-191596

(51) Int. Cl.
  G06F 15/16   (2006.01)
  G06F 17/21   (2006.01)
  G06F 17/27   (2006.01)
(52) U.S. Cl. .............................. 704/10; 704/9; 704/237; 704/256; 709/201; 709/202; 709/223
(58) Field of Classification Search .................... 704/10
  See application file for complete search history.

(56) References Cited

U.S. PATENT DOCUMENTS

| 6,434,523 | B1 * | 8/2002 | Monaco ...................... 704/257 |
| 6,549,943 | B1 * | 4/2003 | Spring ........................ 709/223 |
| 7,191,119 | B2 | 3/2007 | Epstein et al. |
| 2003/0009331 | A1 * | 1/2003 | Schalkwyk et al. ......... 704/237 |
| 2007/0038451 | A1 * | 2/2007 | Cogne et al. ................ 704/256 |

FOREIGN PATENT DOCUMENTS

| JP | 2001-188560 A | 7/2001 |
| JP | 2004-133003 A | 4/2004 |
| WO | 2003/096217 A3 | 11/2003 |

* cited by examiner

*Primary Examiner*—David R Hudspeth
*Assistant Examiner*—Justin W Rider
(74) *Attorney, Agent, or Firm*—Rossi, Kimms & McDowell LLP

(57) ABSTRACT

A speech recognition grammar creating apparatus, which is capable of eliminating complex labor associated with preparing all rules by taking into account changes of the order of component elements of a speech-recognizing object and possible combinations of component elements including at least one component element that can be omitted. In the speech recognition grammar creating apparatus, an image edit section groups together at least one component element that cannot be omitted and at least one component element that can be omitted, as the speech-recognizing object, into a component element group as an omission-allowed group. An augmented BNF converting section creates the speech recognition grammar by expanding the component element group obtained by the grouping.

16 Claims, 7 Drawing Sheets

```
<BREAKFAST>=<DRINK> <BREAD> [<EGG>]
           |<DRINK> <EGG> [<BREAD>]
           |<DRINK>
           |<BREAD> <DRINK> [<EGG>]
           |<BREAD> <EGG> [<DRINK>]
           |<BREAD>
           |<EGG> <DRINK> [<BREAD>]
           |<EGG> <BREAD> [<DRINK >]
           |<EGG>
```

FIG. 2B  <RULE 1>="GOOD MORNING" "EVERYONE"

FIG. 2D  <RULE 2>="GOOD MORNING" [ "EVERYONE"]

FIG. 2F  <RULE 3>= <RULE 4> [ "EVERYONE"]
<RULE 4>= "GOOD MORNING"|"HELLO"

*FIG. 4A*

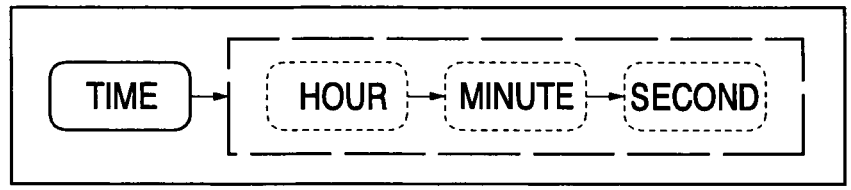

*FIG. 4B*

<TIME>= <HOUR> [<MINUTE>] [<SECOND>]
       |<MINUTE> [<SECOND>]
       |<SECOND>

*FIG. 4C*

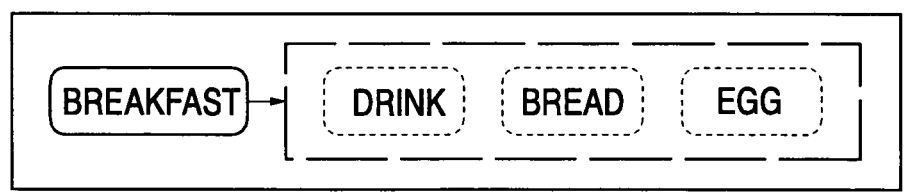

*FIG. 4D*

<BREAKFAST>=<DRINK> <BREAD> [<EGG>]
       |<DRINK> <EGG> [<BREAD>]
       |<DRINK>
       |<BREAD> <DRINK> [<EGG>]
       |<BREAD> <EGG> [<DRINK>]
       |<BREAD>
       |<EGG> <DRINK> [<BREAD>]
       |<EGG> <BREAD> [<DRINK >]
       |<EGG>

*FIG. 7B*
<RULE a>=<A>[<B>][<C>]
|<B>[<C>]
|<C>[<A>][<B>]

*FIG. 7D*
<RULE b>=<A><B>[<C>]
|<A><C>[<B>]
|<A>
|<B>[<C>]
|<C>[<A>][<B>]

SPEECH RECOGNITION GRAMMAR CREATING APPARATUS, CONTROL METHOD THEREFOR, PROGRAM FOR IMPLEMENTING THE METHOD, AND STORAGE MEDIUM STORING THE PROGRAM

BACKGROUND OF THE INVENTION

1. Field of the Invention

The present invention relates to a speech recognition grammar creating apparatus that creates grammars by describing speech-recognizable words and sentences, a control method therefor, a program for implementing the method, and a storage medium storing the program.

2. Description of the Related Art

Conventionally, in describing speech-recognizable contents (speech-recognizing object) as a speech recognition grammar in advance, a speech recognition apparatus generally describes the speech recognition grammar in augmented BNF (Augmented Backus Naur Form), which is a notation for describing a sentence construction. With the speech recognition grammar described in augmented BNF, it is possible to describe a portion of the speech-recognizing object that can be omitted. However, the portion that can be omitted is for designating a certain range within the speech-recognizing object as a portion that can be omitted or not. Therefore, a single speech-recognizing object can only be described by either omitting the portion that can be omitted, or by sounding or not omitting the portion that can be omitted.

On the other hand, a speech recognition apparatus has been proposed (for example, in Japanese Laid-Open Patent Publication (Kokai) No. 2001-188560), which can describe a speech recognition grammar with extended functions to combine component elements (words), such that the order of component elements which constitute a sentence of a speech-recognizing object is not fixed, that is, can be changed. However, this proposed speech recognition apparatus does not deal with omitting component elements.

Further, although a speech recognition grammar is generally described as a text using a text editor, recently there have been used speech recognition apparatuses that graphically describe a speech recognition grammar using a GUI (Graphical User Interface). However, these speech recognition apparatuses also do not deal with combining component elements that can be omitted.

To describe a speech recognition grammar as mentioned above, it is often necessary to describe rules such that the speech recognition apparatus will function even if the user does not speak all the component elements (words) which constitute a sentence of a speech-recognizing object, by setting some kind of default values. For example, to describe a rule to express time, it is assumed here that it is desired to describe a rule which accepts not only cases in which the user of the speech recognition apparatus speaks all the component elements of the speech-recognizing object, "xx hours, xx minutes, xx seconds", but also accepts speech such as "xx hours, xx minutes", "xx minutes, xx seconds", "xx hours", "xx minutes", and "xx seconds", as the speech-recognizing object.

In this case, if all of the component elements are allowed to be omitted as shown below, according to the rule, it becomes possible to omit all the component elements. Thus, a rule matching a speech-recognizing object which is not sounded at all will be described.

<time>=[<hour>][<minute>][<second>]

In the above expression, contents in < > indicate non-terminal nodes (rule names), and contents in [ ] indicate elements that can be omitted.

To describe the rule precisely, it is necessary to create the following three types of combinations, and the number of combinations increases with an increase in the number of component elements.

<time>=<hr>[<min>][<sec>]|<min>[<sec>]|<sec>

In the above expression, | indicates an OR connection and the component element sequence in each combination indicates an AND connection.

To describe a rule that makes it possible to change the order of component elements including component elements that can be omitted, it is necessary to create the rule by taking into account combinations of the order of the component elements, and thus, the number of combinations of the component elements further increases.

For example, in the case of an operation task of a copying machine that is capable of carrying out various settings related to copying operations based on speech input, the operation task has designating elements such as <select paper>, <enlarge/reduce>, <single side/double side>, <sort>, <density>, <number of copies> as component elements of a speech-recognizing object. Assuming that a default setting is set for each designating element, to be applied when the speech-recognizing object corresponding to the designating element is omitted, it is necessary for the user to create all rules taking into account possible changes of the order of the designating elements, as well as possible combinations of designating elements that can be omitted. This causes a problem that the rules become tremendously complex and time consuming to create.

SUMMARY OF THE INVENTION

It is an object of the present invention to provide a speech recognition grammar creating apparatus and a control method therefor, which are capable of eliminating complex labor associated with preparing all rules by taking into account changes of the order of component elements of a speech-recognizing object and possible combinations of component elements including at least one component element that can be omitted, as well as a program for implementing the method, and a storage medium storing the program.

To attain the above object, in a first aspect of the present invention, there is provided a speech recognition grammar creating apparatus that describes a speech-recognizing object as a speech recognition grammar, comprising a grouping device that groups at least one component element that cannot be omitted and at least one component element that can be omitted, as the speech-recognizing object, into a component element group as an omission-allowed group, and a creating device that creates the speech recognition grammar by expanding the component element group obtained by the grouping.

Preferably, the speech recognition grammar creating apparatus according to the first aspect further comprises a presenting device that presents the component element group by obtained by the grouping by the grouping device, and the creating device creates the speech recognition grammar based on an operation of a user according to contents presented by the presenting device, by expanding the component element group obtained by the grouping.

Preferably, the creating device creates the speech recognition grammar in a metalanguage format, by expanding the component element group obtained by the grouping.

Alternatively, the creating device creates the speech recognition grammar in a transition network format, by expanding the component element group obtained by the grouping.

Preferably, the grouping device groups the component element group obtained by the grouping as the speech-recognizing object, after designating an order of component elements of the component element group.

More preferably, the metalanguage format is augmented BNF (Augmented Backus Naur Form).

More preferably, the transition network format is a format in which a combination of component elements is expressed by a network that indicates connections between component elements formed by connecting combinable component elements by arrows.

More preferably, the presenting device graphically displays the component element group obtained by the grouping.

Preferably, the presenting device is capable of presenting an editing work process of operations carried out by the user in response to contents presented on the present device.

To attain the above object, in a second aspect of the present invention, there is provided a control method for a speech recognition grammar creating apparatus that describes a speech-recognizing object as a speech recognition grammar, comprising a grouping step of grouping at least one component element that cannot be omitted and at least one component element that cant be omitted, as the speech-recognizing object, into a component element group as an omission-allowed group, and a creating step of creating the speech recognition grammar by expanding the component element group obtained by the grouping.

To attain the above object, in a third aspect of the present invention, there is provided a program for causing a computer to execute a control method according to the second aspect.

To attain the above object, in a forth aspect of the present invention, there is provided a computer-readable storage medium storing a program according to the third aspect.

With the construction according to the present invention, to describe a group of component elements including at least one component element that can be omitted as a speech recognition grammar, it is possible to intuitively describe the speech recognition grammar without considering redundancy in the combination of component elements or suitability of the rules, etc.

The above and other objects, features, and advantages of the invention will become more apparent from the following detailed description taken in conjunction with the accompany drawings.

BRIEF DESCRIPTION OF THE DRAWINGS

FIGS. 2A to 2F are diagrams showing conventional examples of rules for speech recognition grammars which can be expressed in augmented BNF;

FIGS. 4A to 4D are diagrams showing examples in which omission-allowed groups are converted into augmented BNF;

FIG. 7A to 7D are diagrams showing examples in which the order of a part of the component elements of omission-allowed groups are designated in a speech recognition grammar creating apparatus according to a third embodiment of the present invention.

DETAILED DESCRIPTION OF THE PREFERRED EMBODIMENTS

The present invention will now be described in detail with reference to the drawings showing preferred embodiments thereof.

Figure 1:
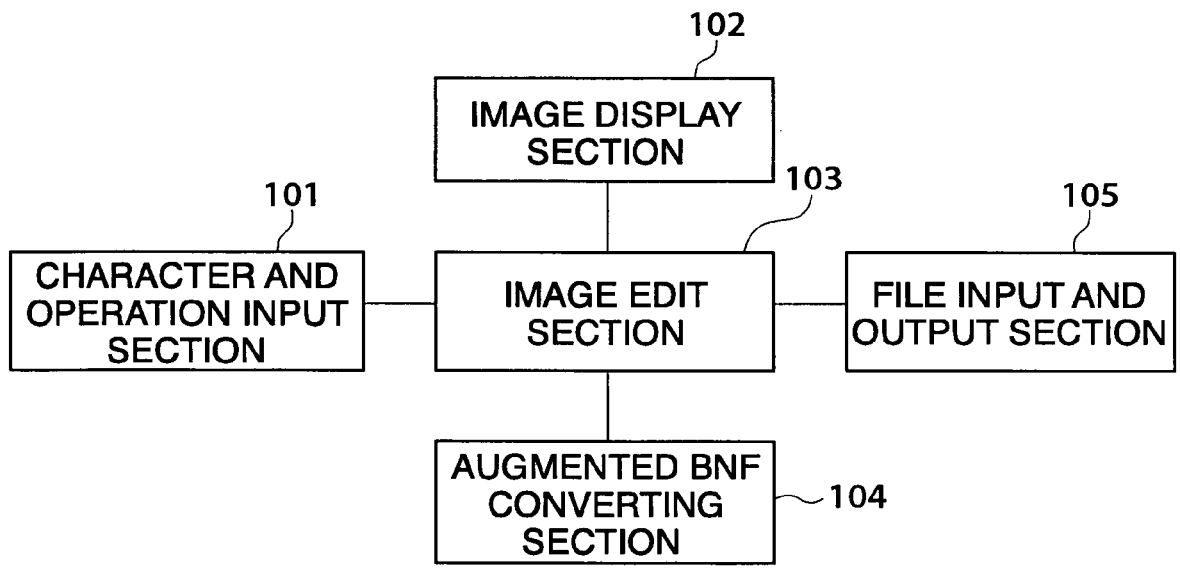
FIG. 1 is a block diagram showing the configuration of a speech recognition grammar creating apparatus according to a first embodiment of the present invention.

FIG. 1 is a block diagram showing the configuration of a speech recognition grammar creating apparatus according to a first embodiment of the present invention.

As shown in FIG. 1, the speech recognition grammar creating apparatus is comprised of a character and operation input section 101, an image display section 102, an image edit section 103, an augmented BNF converting section 104, and a file input and output section 105.

The character and operation input section 101 is comprised of a keyboard and a mouse, not shown, and is used by the user for giving the speech recognition grammar creating apparatus instructions to create a speech recognition grammar and carrying out editing operation of a speech recognition grammar. The image display section 102 graphically displays a speech recognition grammar (refer to FIGS. 4A and 4B, FIGS. 6A and 6B, and FIGS. 7A and 7B) that is being edited, defined by a group of rules of augmented BNF, which is a typical metalanguage (speech description language). The image display section 102 can also display an editing operation process carried out in response to an operation by the user using the character and operation input section 101, according to contents displayed on the image display section 102.

The image edit section 103 receives editing operations carried out by the user using the character and operation input section 101, and changes an image being edited (refer to FIGS. 4A and 4B, FIGS. 6A and 6B, and FIGS. 7A and 7B). For example, the image edit section 103 edits an already created speech recognition grammar that is graphically displayed on the image display section 102, newly creates a speech recognition grammar to be graphically displayed, according to an operation carried out by the user, that is, selecting desired component elements from component elements constituting an already created speech recognition grammar, using the character and operation input section 101, and newly creates a speech recognition grammar to be graphically displayed, according to an input operation carried out by the user using the character and operation input section 101. The augmented BNF converting section 104 converts a graphically displayed speech recognition grammar into augmented BNF in response to an operation carried out by the user using the character and operation input section 101, according to contents displayed on the image display section 102. The file input and output section 105 inputs and outputs an edited-speech recognition grammar that is graphically displayed on the image display section 102, and speech recognition grammars which have been converted into augmented BNF, as files.

The speech recognition grammar creating apparatus is implemented by an information processing apparatus such as a computer. A CPU, a ROM, a RAM, a controller, a hard disk, a display, a keyboard, and a mouse, which are provided in the information processing apparatus, correspond to functions of the sections shown in FIG. 1. Specifically, the character and operation input section 101 corresponds to the keyboard and the mouse, the image display section 102 corresponds to the display. The image edit section 103, the augmented BNF converting section 104, and the file input and output section 105 correspond to the functions of the CPU, a memory controller, and control programs. The CPU carries out a process shown in the flowchart of FIG. 3, based on a control program stored in the ROM or the hard disk.

FIGS. 2A to 2F are diagrams showing conventional examples of rules for speech recognition grammars which can be expressed in augmented BNF.

Figure 2A:
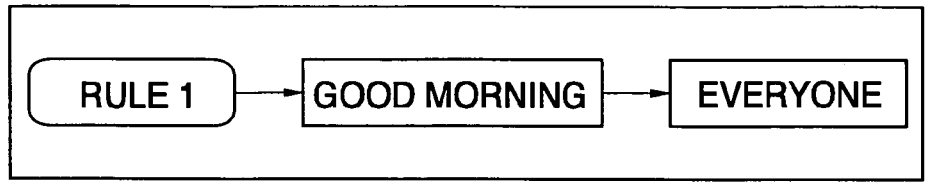
Figure 2C:
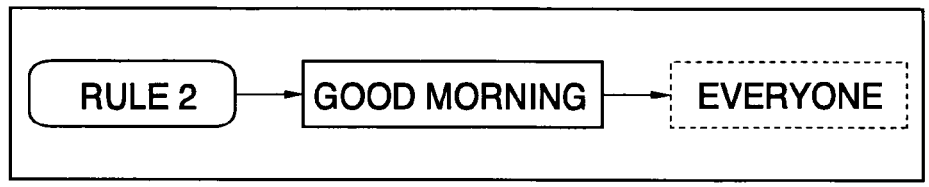
Figure 2E:
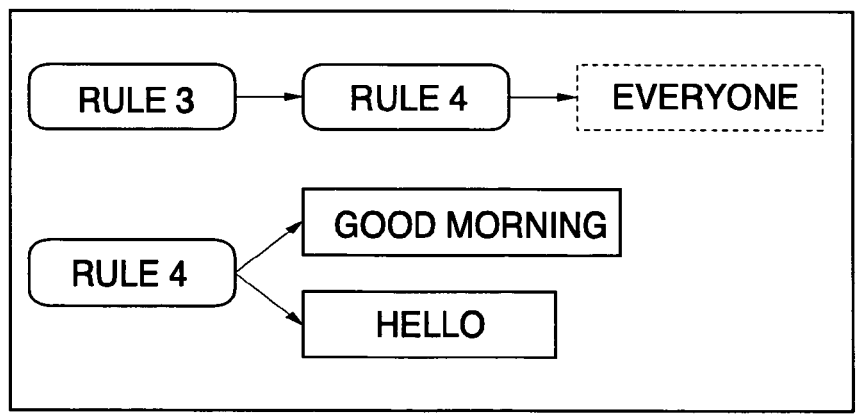

FIGS. 2A, 2C, and 2E are diagrams showing examples of rules for speech recognition grammars graphically displayed on the image display section 102. FIGS. 2B, 2D, and 2C are diagrams showing the speech recognition grammars of FIGS. 2A, 2C, and 2E, expressed in augmented BNF, respectively.

The speech recognition grammars are expressed graphically in the following manner. That is, in FIGS. 2A, 2C, and 2E, rectangular boxes with rounded corners indicate non-terminal nodes (rule names), and rectangular boxes with square corners indicate terminal nodes (words). The leftmost rectangular boxes with rounded corners indicate the left side of the rules, and the rectangular boxes with square corners, pointed to by arrows by the rectangular boxes with rounded corners, indicate the right side of the rules. Rectangular boxes which are indicated by dotted lines indicate that the component elements included in the boxes can be omitted. The nodes which are connected in series by arrows (→) have an AND connection between the nodes, which includes designation of the order of the nodes in the direction of the arrows, and the nodes which are connected in parallel by arrows (→) have an OR connection between the nodes.

The speech recognition grammars are expressed in augmented BNF in the following manner. That is, in FIGS. 2B, 2D, and 2F, parts enclosed by < > indicate non-terminal nodes (rule names), and parts enclosed by " " indicate terminal nodes (words). The left side of = indicates the left side of the rules, and the right side of = indicates the right side of the rules. Parts enclosed by [ ] indicate the parts or component elements that can be omitted. On the right side of the rule, | indicates an OR connection, and the absence of | indicates an AND connection.

Rule 1 in FIGS. 2A and 2B indicates that the speech recognition apparatus accepts a speech "good-morning, everyone" from the user. Rule 2 in FIGS. 2C and 2D indicates that the speech recognition apparatus accepts a speech "good-morning, everyone" or "good-morning" from the user. Rules 3 and 4 in FIGS. 2E and 2F indicate that the speech recognition apparatus accepts a speech, "good-morning, everyone", "hello, everyone", "good-morning", or "hello", from the user.

Next, processes which are characteristic to the speech recognition grammar creating apparatus according to the present embodiment will be described with reference to FIG. 3 and FIGS. 4A to 4D.

Figure 3:
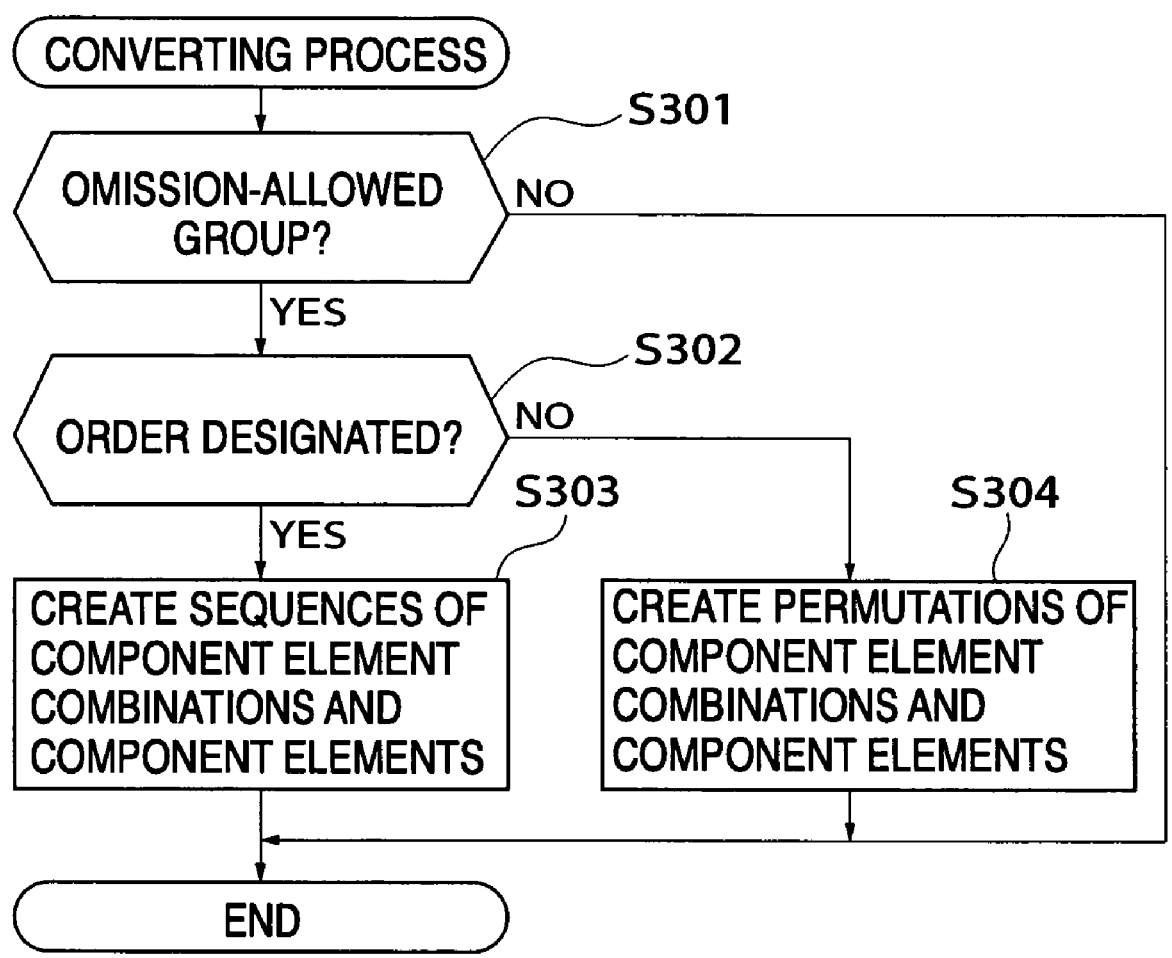
FIG. 3 is a flowchart showing a process for converting a group of component elements that can be omitted (hereinafter referred to as "omission-allowed group") including at least one component element that cannot be omitted, into augmented BNF.

FIG. 3 is a flowchart showing a process for converting an omission-allowed group including at least one component element that cannot be omitted (i.e. all component elements except for at least one component element can be omitted), into augmented BNF. The process shown in this flowchart indicates an internal development of the omission-allowed group only, and methods to convert conventional rules into augmented BNF, as shown in FIG. 2, are omitted.

Referring to FIG. 3, first, the augmented BNF converting section 104 determines whether a group of n component elements is an omission-allowed group (step S301). If it is determined that the group of n component elements is not an omission-allowed group, the augmented BNF converting section 104 terminates the process. If it is determined that the group of n component elements is an omission-allowed group, the augment BNF converting section 104 determines whether there is a designation of the order in which the component elements are to be arranged (step S302).

If it is determined that there is a designation of the order of the component elements (that is, one or more arrows→are provided between component elements), the augmented BNF converting section 104 creates respective sequences of one or more combinations of two or more of the n component elements and one or more individual component elements of the n component elements according to the designated order (step S303). If it is determined that there is no designation of the order of the component elements, the augmented BNF converting section 104 creates respective permutations of one or more combinations of two or more of the n component elements and one or more individual component elements of the n component elements (step S304), followed by termination of the process. It should be noted that the at least one component element that cannot be omitted is not fixed and is selected from the n component elements.

FIGS. 4A to 4D are diagrams showing examples in which omission-allowed groups are converted into augmented BNF. FIGS. 4A and 4C each show an example of a rule created by an operation of the user according to contents of an omission-allowed group that is graphically displayed on the image display section 102. FIGS. 4B and 4D show speech recognition grammars expressed in augmented BNF, in which the combinations of the component elements of the omission-allowed groups are expanded based on the rules in FIGS. 4A and 4C, respectively.

FIGS. 4A and 4B show an example of a rule to express time. This rule is an example of an omission-allowed group in which the order of the component elements is designated, but in which all the component elements can be omitted except for a minimum number of (at least one) component element. In the present embodiment, in the rule which is graphically displayed on the image display section 102, the group of component elements included in the rectangular boxes indicated by dotted lines is an omission-allowed group. Specifically, in FIG. 4A, the rectangular boxes indicated by dotted lines enclosing the words "hour", "minute", and "second" indicate the omission-allowed group. Description of specific definitions of the rule of <hour>, <minute>, and <second> is omitted. Such an omission-allowed group is created by grouping by the image edit section 103 according to an operation of the user using the character and operation input section 101. Specifically, for example, the user carries our a predetermined operation using the character and operation input section 101 so that the image edit section 103 edits an already created speech recognition grammar graphically displayed on the image display section 102 or selects desired component elements from component elements that are to constitute a new speech recognition grammar or desired component elements constituting an already created speech recognition grammar, to thereby create a group of component elements. Then, the user carries out a predetermined operation using the character and operation input section 101 so that the image edit section 103 sets the group of component elements as an omission-allowed group in which at least one component element cannot be omitted (grouping). The thus set omission-allowed group is graphically displayed on the image display section 102 by the image edit section 103 (see FIG. 4A).

In the example shown in FIGS. 4A and 4B, to express the combination of component elements in augmented BNF, the symbol [] is used to indicate component elements that can be omitted in augmented BNF notation. Therefore, the component elements are expressed in three ways as shown in FIG. 4B. However, if the symbol [] is not used, the component elements will be expressed in 1+3+3=7 ways, as follows.

<time>=<hour> <minute> <second>
    |<hour> <minute>
    |<hour> <second>
    |<minute> <second>
    |<hour>
    |<minute>
    |<second>

FIGS. 4C and 4D show an example of a rule to order breakfast. This rule is an example of an omission-allowed group in which the order of the component elements is not designated. A <drink> may be "coffee", "tea" etc., a <bread> may be "toast", "croissant" etc., and an <egg> may be "omelet", "fried eggs", etc., however, specific examples are omitted.

In the example shown in FIGS. 4C and 4D, the symbol [] is used to indicate component elements that can be omitted in augmented BNF notation, and therefore there are nine ways to express the component elements. However, if the symbol [] is not used, the ways to express the component elements will be 3*2*1+3*2+3=15 ways, as follows.

<breakfast>=<drink> <bread> <egg>
    |<drink> <bread>
    |<drink> <egg> <bread>
    |<drink> <egg>
    |<drink>
    |<bread> <drink> <egg>
    |<bread> <drink>
    |<bread> <egg> <drink>
    |<bread> <egg>
    |<bread>
    |<egg> <drink> <bread>
    |<egg> <drink>
    |<egg> <bread> <drink>
    |<egg> <bread>
    |<egg>

In the present embodiment, at least one component element that cannot be omitted and at least one component element that can be omitted as the speech-recognizing object are grouped together into an omission-allowed group by the image edit section 103. The component element group as an omission-allowed group thus obtained by grouping is graphically displayed by the image display section 102. Then, based on the operation of the user according to the contents that are displayed, the augmented BNF converting section 104 creates and outputs a speech recognition grammar in augmented BNF by expanding the component element group as an omission-allowed group.

As described above, according to the present embodiment, to describe a group of component elements which includes at least one component element that can be omitted as a speech recognition grammar, it is possible to intuitively describe the speech recognition grammar without considering redundancy in the combination of component elements or suitability of the rules, etc. As a result, it is possible to eliminate the complex labor with the prior art associated with preparing all rules by taking into account changes of the order of the component elements and possible combinations of component elements including at least one component element that can be omitted. Thus, support for the user to effectively create speech recognition grammar can be provided.

Next, a second embodiment of the present invention will be described.

The second embodiment of the present invention differs from the first embodiment in that the speech recognition grammar creating apparatus is provided with a transition network converting section in lieu of the augmented BNF converting section. The other elements of the second embodiment are the same as corresponding ones of the first embodiment (FIG. 1) described above, and description thereof is, therefore, omitted.

In the first embodiment, an example of converting an omission-allowed group to a speech recognition grammar in augmented BNF was described. In the second embodiment, an example of converting an omission-allowed group to a speech recognition grammar in a transition network format will be described.

Figure 5:
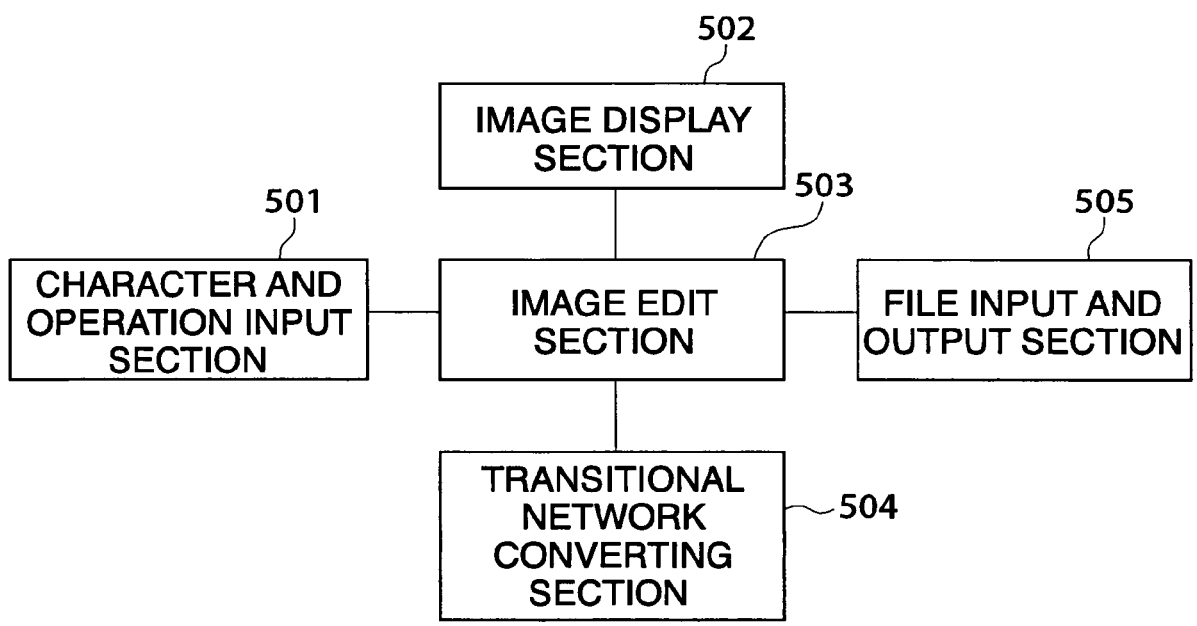
FIG. 5 is a block diagram showing the configuration of a speech recognition grammar creating apparatus according to a second embodiment of the present invention.

FIG. 5 is a block diagram showing the configuration of a speech recognition grammar creating apparatus according to the second embodiment of the present invention.

As shown in FIG. 5, the speech recognition grammar creating apparatus is comprised of a character and operation input section 501, an image display section 502, an image edit section 503, a transition network converting section 504, and a file input and output section 505.

The transition network converting section 504 converts the omission-allowed group to the transition network format as shown in FIGS. 6A to 6D, described below. The transition network format refers to a format in which a combination of component elements is expressed by a network that indicates connections between component elements formed by connecting combinable component elements by arrows.

Figure 6A:
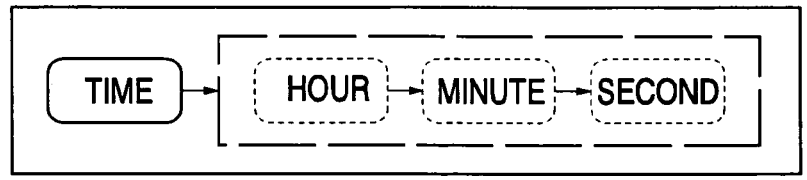
FIGS. 6A to 6D are diagrams showing examples in which omission-allowed groups are converted into a transition network format.
Figure 6B:
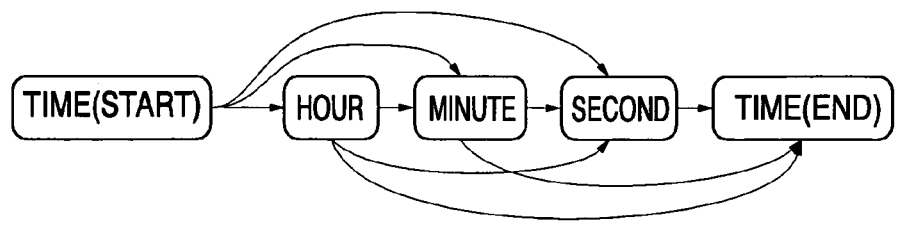
Figure 6C:
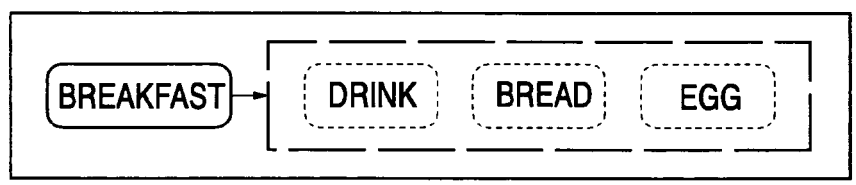
Figure 6D:
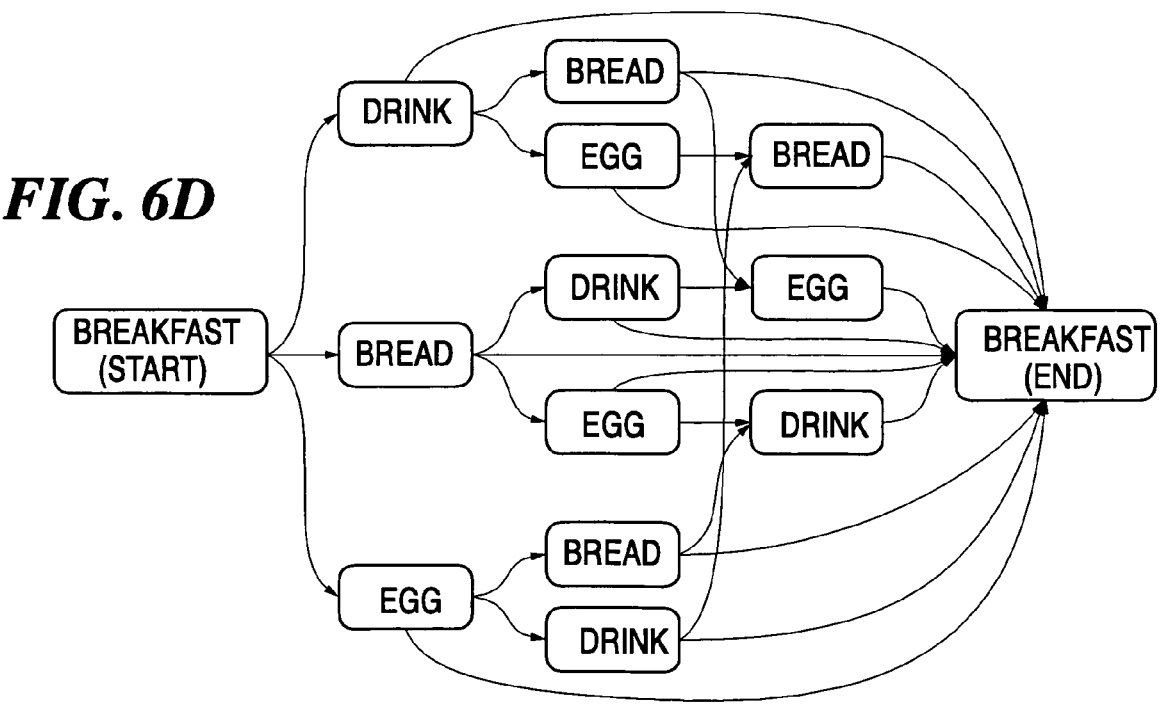

FIGS. 6A to 6D are diagrams showing examples in which omission-allowed groups are converted into the transition network format. FIGS. 6A and 6C each show an example of a rule created by an operation of the user according to contents of an omission-allowed group that is graphically displayed on the image display section 502. FIGS. 6B and 6D show the speech recognition grammar expressed in the transition network format in which the combinations of the component elements of the omission-allowed groups are expanded based on the rules in FIGS. 6A and 6C, respectively.

FIGS. 6A and 6B show an example of a rule to express time. As shown in FIGS. 6A and 6B, the component elements of the rule to express time are converted into the transition network format to be expressed as <hour> <minute> <second>, <hour> <minute>, <hour> <second>, <hour>, <minute> <second>, <minute>, and <second>.

FIGS. 6C and 6D show an example of a rule to order breakfast. As shown in FIGS. 6C and 6D, the component elements of the rule to order breakfast are converted into the transition network format to be expressed as <drink> <bread> <egg>, <drink> <bread>, <drink> <egg> <bread>, <drink> <egg>, <drink>, <bread> <drink> <egg>, <bread> <drink>, <bread> <egg> <drink>, <bread> <egg>, <bread>, <egg> <drink> <bread>, <egg> <drink>, <egg> <bread> <drink>, <egg> <bread>, <egg> <drink>, and <egg>.

In the present embodiment, at least one component element that cannot be omitted and at least one component element that can be omitted as the speech-recognizing object are grouped together into an omission-allowed group by the image edit section 503. The component element group as an omission-allowed group thus obtained by grouping is graphically displayed by the image display section 502. Then, based on the operation of the user according to the contents that are displayed, the transition network converting section 504 creates and outputs a speech recognition grammar in a transition network format by expanding the component element group as an omission-allowed group.

As described above, according to the present embodiment, as in the first embodiment, it is possible to eliminate the complex labor with the prior art associated with preparing all rules to take into account changes of the order of the component elements and possible combinations of the component elements that can be omitted. Thus, support for the user to effectively create speech recognition grammar can be provided.

Next, a third embodiment of the present invention will be described.

The third embodiment of the present invention differs from the first and second embodiments in the following points. The other elements of the third embodiment are the same as corresponding ones of the first and second embodiments (FIG. 1 and FIG. 5, respectively) described above, and description thereof, is therefore, omitted.

In the first embodiment described above, a designation of order is made on all or none of the component elements within the omission-allowed group. In the third embodiment, a designation of order can be made on a part of the component elements of the omission-allowed group.

Figure 7A:
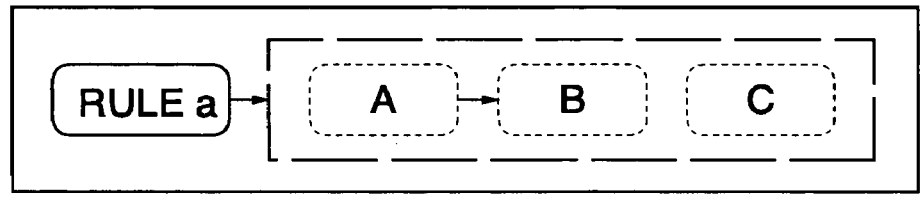
Figure 7C:
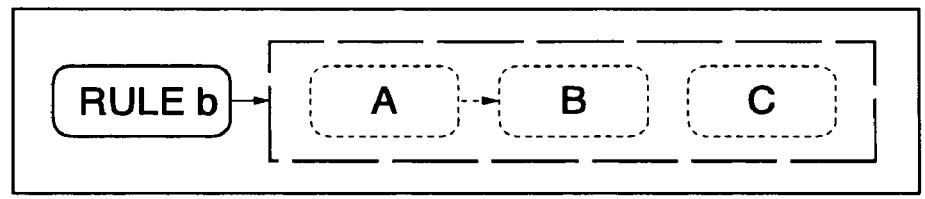

FIG. 7A to 7D are diagrams showing examples in which the order of a part of the component elements of omission-allowed groups are designated in a speech recognition grammar creating apparatus according to the third embodiment. FIGS. 7A and 7C each show an example of a rule created by an operation of the user according to contents of the omission-allowed group that are graphically displayed on the image display section 102. FIGS. 7B and 7D show speech recognition grammars expressed in augmented BNF, in which the combinations of the component elements of the omission-allowed groups are expanded based on the rules in FIGS. 7A and 7C, respectively.

FIGS. 7A and 7B show an example of a rule a for component elements A to C. The rule a of FIGS. 7A and 7B is an example in which the order of a component element A→a component element B is designated, and either the component element A or the component element B can be omitted but another component element cannot be inserted in between the component element A and the component element B. The connection between the component element A and the component element B is indicated by a solid line arrow.

FIGS. 7C and 7D show an example of a rule b for component elements A to C. The rule b of FIGS. 7C and 7D is an example in which the component element C can be inserted in between the component element A and the component element B, insofar as the order of the component element A and the component element B is not reversed. The connection between the component element A and the component element B is indicated by a dotted line arrow.

In the above description, an example in which the order of a part of component elements of the omission-allowed groups are designated using the speech recognition grammar creating apparatus of FIG. 1. However, this is the same when using the speech recognition grammar creating apparatus of FIG. 5.

In the present embodiment, at least one component element that cannot be omitted and at least one component element that can be omitted as the speech-recognizing object are grouped together into an omission-allowed group by the image edit section 103 (or the image edit section 503) after designation of the order of a part of the component elements. The component element group as an omission-allowed group thus obtained by grouping is graphically displayed by the image display section 102 (or the image display section 502). Then, based on the operation of the user according to the contents that are displayed, the augmented BNF converting section 104 (or the transition network converting section 504) creates and outputs a speech recognition grammar in augmented BNF (or a transition network format) by expanding the component element group as an omission-allowed group.

As described above, according to the present embodiment, as in the first embodiment, it is possible to eliminate the complex labor with the prior art associated with preparing all rules to take into account changes of the order of the component elements and possible combinations of the component elements that can be omitted. Thus, support for the user to effectively create speech recognition grammar can be provided.

In the first to third embodiments, the component element group of at least one component element that cannot be omitted and at least one component element that can be omitted, obtained by grouping, is graphically displayed, and a speech recognition grammar is created based on an operation of the user according to the contents that are displayed. However, the present invention is not limited to this, and may be configured such that a speech recognition grammar is created based on the grouped component element group of at least one component element that cannot be omitted and at least one component element that can be omitted, obtained by grouping, without graphically displaying the component element group.

Further, in the first to third embodiments, the component elements that can be omitted are indicated using a frame in dotted lines, and the omission-allowed groups of at least one component element that cannot be omitted and at least one component element that can be omitted are indicated using a rectangular box in dotted lines. However, the types of lines and shapes do not need be limited to a specific line or shape. For example, the component elements may be distinguished by the width or color of the frames, the background color, or the like. Further, the grouping may be expressed by such methods as enclosing the component elements in a square or a circle, or drawing a consecutive line under a plurality of component elements.

Further, in the first to third embodiments, description of a speech recognizing section is omitted while description is given of only the function of creating a speech recognition grammar. However, the invention may be configured such that speech recognition performance may be tested using the speech recognition grammar as a function of a speech recognition grammar creating tool. To realize such a configuration (speech recognition apparatus), a speech input apparatus is needed in addition to the speech recognition grammar creating apparatus. In this case, it becomes possible to use the speech recognition grammar even if the speech recognition grammar is not outputted as a file.

Further, in the first to third embodiments, the field of applicability of the speech-recognition grammar creating apparatus is not specifically mentioned. However, the speech recognition grammar creating apparatus may be applied in various fields, such as setting of combinations of designating elements (selection of paper, enlarge/reduce, number of copies, etc.) as an operation task for image forming apparatuses (printers, copiers, multi-function machines, etc.) having a speech input function.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, CD-RW, DVD-ROM, DVD-RAM, DVD-RW, and DVD+RW, a magnetic tape, a nonvolatile memory card, and a ROM. Alternatively, the program may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

In this case, the program code may be supplied directly from a storage medium on which the program code is stored, or from a computer, database, or the like, not shown, that is connected via the Internet, a commercial network, a local area network, or the like.

Further, the program code may be implemented by an object code, a program executed by an interpreter, or script data supplied to an OS, or the like.

Cross Reference To Related Application

This application claims priority from Japanese Patent Application No. 2004-191596 filed Jun. 29, 2004, which is hereby incorporated by reference herein.

What is claimed is:

1. A speech recognition grammar creating apparatus that describes a speech-recognizing object as a speech recognition grammar, comprising:
    a grouping unit adapted to create a component group of n component elements, wherein n is an integer not less than 2;
    a first determination unit adapted to determine if the component group of n component elements is a group including at least one component element that cannot be omitted;
    a second determination unit adapted to determine if the n component elements are order designated when it is determined by said first determination unit that the component group is the group including the at least one component element that cannot be omitted; and
    a creating unit adapted to create the speech recognition grammar by creating sequences of the n component elements and combinations thereof according to the designated order when it is determined by said second determination unit that the n component elements are order designated, and by creating respective permutations of the n component elements and combinations thereof when it is determined by said second determination unit that the n component elements are not order designated.

2. A speech recognition grammar creating apparatus as claimed in claim 1, further comprising a display device that displays the sequences of the n component elements and combinations thereof and and the permutations of the n component elements and combinations thereof created by said creating device.

3. A speech recognition grammar creating apparatus as claimed in claim 2, wherein said display device is a graphic display device.

4. A speech recognition grammar creating apparatus as claimed in claim 2, further comprising an input section, wherein said display device displays an editing work process of operations in response to input data entered by a user in response to contents presented on said display device.

5. A speech recognition grammar creating apparatus as claimed in claim 1, wherein said creating device creates the speech recognition grammar in a metalanguage format.

6. A speech recognition grammar creating apparatus as claimed in claim 5, wherein the metalanguage format is augmented BNF (Augmented Backus Naur Form).

7. A speech recognition grammar creating apparatus as claimed in claim 1, wherein said creating device creates the speech recognition grammar in a transition network format.

8. A speech recognition grammar creating apparatus as claimed in claim 7, wherein the transition network format is a format in which a combination of component elements is expressed by a network that indicates connections between component elements formed by connecting combinable component elements by arrows.

9. A computer-readable storage medium encoded with computer executable instructions that cause a computer to execute a control method for a speech recognition grammar creating apparatus that describes a speech-recognizing object as a speech recognition grammar, the method comprising:
    creating a component group of n component elements, wherein n is an integer not less than 2;
    determining if the component group on n component elements is a group including at least one component element that cannot be omitted;
    determining if the n components elements are order designated when it is determined by said first determination unit that the component group is the group including the at least one component element that cannot be omitted; and
    creating the speech recognition grammar by creating sequences of the n component elements and combinations thereof according to the designated order when it is determined by said second determination unit that the n components elements are order designated, and by creating respective permutations of the n component elements and combinations thereof when it is determined by said second determination unit that the n components elements are not order designated.

10. A control method for a speech recognition grammar creating apparatus that describes a speech-recognizing object as a speech recognition grammar, comprising:
    creating a component group of n component elements, wherein n is an integer not less than 2;
    determining if the component group on n component elements is a group including at least one component element that cannot be omitted;

determining if the n component elements are order designated when it is determined by said first determination unit that the component group is the group including the at least one component element that cannot be omitted; and creating the speech recognition grammar by creating sequences of the n component elements and combinations thereof according to the designated order when it is determined by said second determination unit that the n component elements are order designated, and by creating respective permutations of the n component elements and combinations thereof when it is determined by said second determination unit that the n component elements are not order designated.

11. A control method as claimed in claim 10, further comprising displaying the sequences of the n component elements and combinations thereof and the permutations of the n component elements and combinations thereof on a display device.

12. A control method as claimed in claim 10, wherein the speech recognition grammar is created in a metalanguage format.

13. A control method as claimed in claim 12, wherein the metalanguage format is augmented BNF (Augmented Backus Naur Form).

14. A control method as claimed in claim 10, wherein the speech recognition grammar is created in a transition network format.

15. A control method as claimed in claim 14, wherein the transition network format is a format in which a combination of component elements is expressed by a network that indicates connections between component elements formed by connecting combinable component elements by arrows.

16. A control method as claimed in claim 11, wherein said display device displays an editing work process of operations in response to input data entered by a user via an input device in response to contents presented on said display device.

* * * * *